May 5, 1942.  J. FOSSA  2,281,686
LACING MACHINE
Filed July 1, 1938  9 Sheets-Sheet 1

Fig. 1

Witness
Paul F. Bryant

Inventor
Joseph Fossa
by his attorneys

May 5, 1942. J. FOSSA 2,281,686
LACING MACHINE
Filed July 1, 1938 9 Sheets-Sheet 2

Fig. 2

Witness
Paul F. Bryant

Inventor
Joseph Fossa
by his Attorneys
Fish, Hildreth, Cary & Jenney

May 5, 1942.  J. FOSSA  2,281,686
LACING MACHINE
Filed July 1, 1938   9 Sheets-Sheet 3

Fig. 3

Witness
Paul F. Bryant

Inventor
Joseph Fossa
by his attorneys,
Fish, Hildreth, Cary & Jenney

Fig. 4

May 5, 1942.   J. FOSSA   2,281,686
LACING MACHINE
Filed July 1, 1938   9 Sheets-Sheet 5

Witness
Paul F. Bryant

Inventor
Joseph Fossa
by his attorneys
Fish Hildreth Cary & Jenney

May 5, 1942.  J. FOSSA  2,281,686

LACING MACHINE

Filed July 1, 1938  9 Sheets-Sheet 6

Witness
Paul F. Bryant

Inventor
Joseph Fossa
by his attorneys
Fish, Hildreth Cary & Jenney

May 5, 1942.  J. FOSSA  2,281,686
LACING MACHINE
Filed July 1, 1938   9 Sheets-Sheet 7

Witness
Paul F. Bryant

Inventor
Joseph Fossa
by his Attorneys
Fish, Hildreth, Cary & Jenney

May 5, 1942.  J. FOSSA  2,281,686
LACING MACHINE
Filed July 1, 1938   9 Sheets-Sheet 8

Witness
Paul F. Bryant

Inventor
Joseph Fossa
by his attorneys
Fish, Hildreth, Cary & Jenney

May 5, 1942.　　　　J. FOSSA　　　2,281,686
LACING MACHINE
Filed July 1, 1938　　　9 Sheets-Sheet 9

Witness
Paul F. Bryant

Inventor
Joseph Fossa
by his attorneys
Fish, Hildreth, Cary & Jenney

Patented May 5, 1942

2,281,686

UNITED STATES PATENT OFFICE 2,281,686

LACING MACHINE

Joseph Fossa, Salem, Mass., assignor to United Shoe Machinery Corporation, Borough of Flemington, N. J., a corporation of New Jersey Application July 1, 1938, Serial No. 217,003

25 Claims. (Cl. 112—5)

The present invention relates to improvements in shoe upper lacing machines and to driving and stopping mechanisms, particularly adapted for use in controlling the operations of shoe upper lacing machines, and is hereinafter illustrated as embodied in a shoe upper lacing machine similar in many respects to that disclosed in U. S. Letters Patent of the present inventor No. 2,106,320 of January 25, 1938, in which there are a plurality of lacing needles or other eyelet engaging devices for impaling the eyelet holes of an upper prior to being laced.

One object of the present invention is to provide a machine for lacing a shoe upper in a more uniform and effective manner than heretofore, regardless of irregularities in spacings between the eyelets in the upper.

Another object of the present invention is to provide a shoe upper lacing machine which will be more easily operated and controlled and in which the operations will be free from the necessity of difficult manipulations or adjustments on the part of the operator.

Other objects of the invention are to provide novel and improved driving and stopping mechanisms for a shoe upper lacing machine which will be capable of being controlled more easily and accurately than heretofore and, in general, to simplify the construction and improve the mode of operation of the lacing mechanisms of such a machine.

In the machine of the present inventor's patent, there is provided a manually controlled spacing mechanism having proportionally actuated links connected to the lacing mechanisms for adjusting the positions of the lacing needles equally with respect to each other to permit the machine to operate successively on shoe uppers of different sizes and styles in which the eyelet spacings may vary over a wide range. Frequently, due to unavoidable irregularities in manufacture, the distances between eyelets in the same shoe upper may differ so that certain eyelets are closer together than others, and where the distance between the needles of the machine are kept equal by adjustment of the spacing mechanism, the greatest separation between the needles is limited by the distance between the closest pair of eyelets, the upper between the other more widely spaced eyelets being bowed or puckered by the needles to take up the surplus length of upper material. With such an upper, it is impossible by equally spacing the lacing mechanisms to insure accurate registry of the needles and eyelets.

The patented machine is equipped with upper clamping members to grip the upper before the lacing operations are started. These clamping members act to force any existing bowed or puckered portions of the upper into the same plane and hold the uppers in straightened condition. When the upper is forcibly straightened after being bowed or puckered from inaccurate registry of the needles and eyelets, the straightening force of the clamping members on the upper tends to spread the eyelets at the outside of previously puckered portions, throwing the needles and other lacing mechanisms out of alinement. When this condition arises, the machine may operate improperly, or work of inferior quality may result.

An important feature of the invention, therefore, relates to the provision in a shoe upper lacing machine having lacing mechanism including a plurality of needles or other eyelet engaging devices, of means for spacing said devices relatively to each other, so arranged as to render adjacent devices capable of being separated or brought together independently of the relation in which they are spaced by the spacing mechanism. Preferably the eyelet engaging devices are adjustable by contact with the eyelets and, in the form of the invention disclosed, the spacing mechanism is disconnected from the eyelet engaging devices in order to permit the independent spacing adjustment. The spacings of the eyelet engaging devices thus, when the spacing mechanism is disconnected, are adjusted by the action of the eyelets while the upper clamping members are moving to grip the upper. In the embodiment of this feature of the invention, the clamping members which straighten the upper and cause the eyelet engaging devices to be spaced by the action of the eyelets also assist in securing the lacing mechanism from relative movement during lacing operations.

Broadly considered, any suitable means for disconnecting the eyelet engaging devices may be employed and, in the machine as illustrated, the disconnecting means comprise wedging means which are withdrawn from joints between the parts of the spacing mechanism before the lacing operations are started.

In the patented machine the needles constitute eyelet locating devices upon which the upper is placed by the operator while the machine is at rest. In any shoe upper lacing machine provided with eyelet locating needles or other devices upon which the upper is placed by the operator, it is new to provide means whereby the eyelet locating devices are permitted a spacing adjustment by the action of the impaled eyelets on the locating devices and, accordingly, the provision of such means is considered to be a feature of the present invention irrespective of the particular means which may be embodied in the machine for producing or permitting an initial spacing adjustment of the devices.

Frequently it is found to be unnecessary to lace as many eyelets as there are eyelet engaging needles in a lacing machine, and certain needles and their cooperating lacing devices are therefore rendered inoperative. To avoid the possibility that any inoperative lacing devices will be moved by the spacing mechanism to positions where they will prevent proper application of an upper to the machine or where they will prevent lacing the eyelets of an upper having eyeletted edges of marked curvature as for small-sized high-cut shoes, a feature of the present invention is embodied in means for disabling the spacing connections of the spacing mechanism for the inoperative lacing devices of a lacing machine so that said devices may be held in positions where they will not interfere with such an upper while being applied to the machine or while being laced.

Other features of the invention relate to means for disconnecting and again connecting the lacing mechanisms of a shoe upper lacing machine from the spacing mechanism whenever the machine is started and stopped respectively, to novel and improved constructions for the driving and stopping mechanisms which will render the lacing mechanism of such a machine more accurate in operation and more easily controlled and which will render the driving and stopping mechanisms more durable in continued use than in previous lacing machines, and to the novel devices, combinations and arrangements of parts hereinafter described and claimed.

The several features of the invention and the advantages to be obtained thereby will be readily understood by one skilled in the art from the following description taken in connection with the accompanying drawings in which Figures 18 and 21 inclusive are plan views of the parts shown in Figures 14 to 17 inclusive illustrating the positions assumed in the successive figures respectively.

The lacing machine illustrated in the drawings is similar except as hereinafter described, to that of inventor's prior patent above identified. It is provided with a row of parallel eye-pointed needles 2 on which oppositely disposed alined eyelets in the quarter portions of a folded shoe upper are impaled by the operator before each lacing operation. When the machine is started, the upper is gripped in its folded condition and held in the machine until the lacing is completed. The machine is provided with a series of individual clamping members 4 and 6, two for each lacing needle, and with upper and lower clamping jaws 8 and 10, the upper one of which carries a horizontally projecting rod 12 extending in front of all the needles. The machine is operated by a main driven shaft 14 rotating in bearings in the main frame 16 of the machine, and carrying at its right end a driving pulley 18 rotatable thereon (see Fig. 5). The driving pulley 18 comprises the driving member of a driving and stopping mechanism, and is connected with the main shaft by depressing a treadle connected rod 20, best shown in Fig. 2, which provides a manual control for the driving and stopping mechanism to be hereinafter described.

Figures 8, 9:
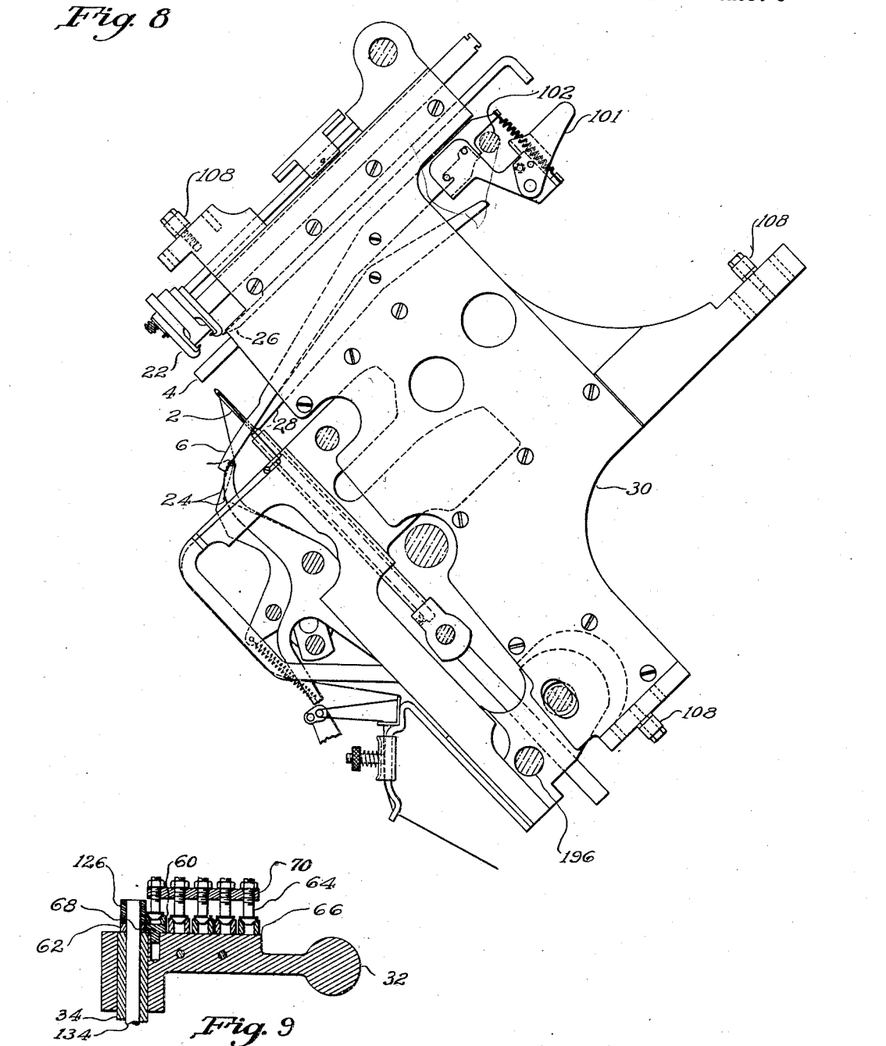
Figure 8 is a detail view, in side elevation, on an enlarged scale, of one of the lacing mechanisms of the machine shown in Figure 1.
Figure 9 is a sectional view of the disconnectible connections illustrated in Figures 6 and 7.

As in the machine of the patent, each needle and many of the devices cooperating with the needle to form the lacing, including the individual clamping members 4 and 6, a loop taker 22, which cooperates with each needle, cord end grippers 24, a cutter 26, and a thread measuring finger 28 are carried by a separate frame 30, as illustrated in Fig. 8 which is movably mounted as in the machine of the patent so as to be adjustable for spacing the needles in accordance with the spacings of eyelets in the upper to be operated upon.

To keep the lacing mechanism frames 30 in parallel relation with each other, and to permit them to be equally spaced when successive uppers having differently spaced eyelets are to be operated upon, each frame is connected at three points to a manually operated spacing mechanism having the same construction and mode of operation, except as hereinafter indicated, as the spacing mechanism of the patented machine.

The manually controlled spacing lever of this mechanism is indicated at 32. The lever 32 is secured to the upper end of an inclined hollow adjusting shaft 34, the lower end of which carries an arm 36. At equal distances along the lever 32 and arm 36, connections are made to the upper and lower portions of the different lacing frames, and the rearward portions of the lacing frames are connected to an arm 38 similar to the arm 36. The arm 38 is secured to the lower end of an inclined hollow adjusting shaft 40 parallel with the shaft 34 and having at its upper end an arm 42 connected to turn with an arm of spacing lever 32 by means of a link 44. The arm 36 and 38, and lever 32 are thus caused to adjust the lacing mechanism supporting frames equally so that successive uppers having differently spaced eyelets may be applied to the needles 2.

Figure 10:
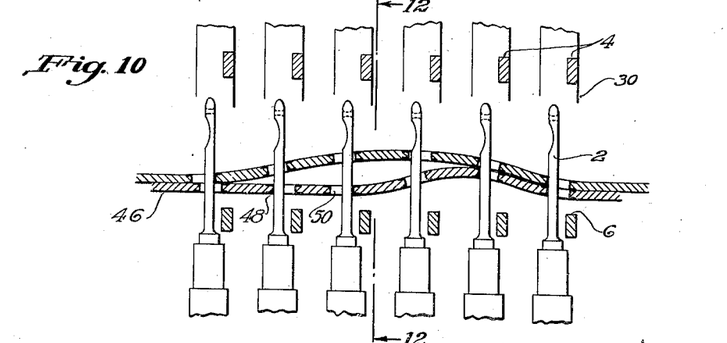
Figure 10 is a somewhat diagrammatic view of the lacing mechanisms including the lacing needles, illustrating the positions assumed by an upper, the eyelets of which have been improperly inserted at unequal distances apart, when the folded upper is first placed on the needles.
Figure 12:
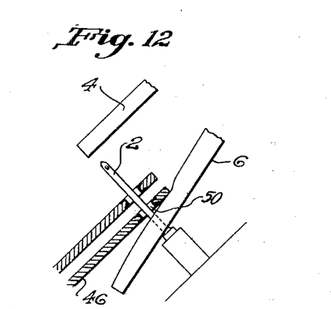
Figure 12 is a detail sectional view taken along the line 12—12 of Figure 10.

Ordinarily in the manufacture of a shoe upper, the eyelets are inserted equal distances apart and in small-sized shoes this distance is less and in larger-sized, it is greater, the spacings between adjacent eyelets in each individual upper remaining equal, regardless of size. However, on account of difficulties in manufacture or from contractions in certain parts of the upper after the eyelets have been inserted, a certain amount of unevenness in spacing between eyelets is inevitable. In Figures 10 and 12 of the drawings there is illustrated an upper 46 having a pair of eyelets 48 and 50, in one side or quarter of the upper, the distances between which pair of eyelets is shorter than the distance between any of the other adjacent pairs of eyelets. When the upper 46 having unequally spaced eyelets is applied to the machine, the spacings produced by the spacing mechanism between the lacing mechanisms are limited by the needles which engage the eyelets 48 and 50 since all of the lacing mechanisms can only separate by equal amounts. As a result of this limitation in spacing, the mechanisms other then those which act on eyelets 48 and 50 are held too close together and the needles of these mechanisms act on the eyelets which they have engaged to crowd the upper into a bowed or puckered condition as illustrated. If the upper 46 is secured in the machine without allowing the eyelets to separate far enough for the upper to lie flat, the registering eyelets in the opposite side of the upper may not be held securely by the clamping members and jaws so that the different operating devices of the lacing mechanisms will not perform their functions properly. There also is a tendency for the individual clamping members 4 and 6 in gripping the upper to cause insufficiently separated eyelets to be forced against the lacing needles so as to throw the needles out of alignment with their respective loop takers or to prevent the needles from reentering the eyelets after having once been withdrawn.

Figure 11:
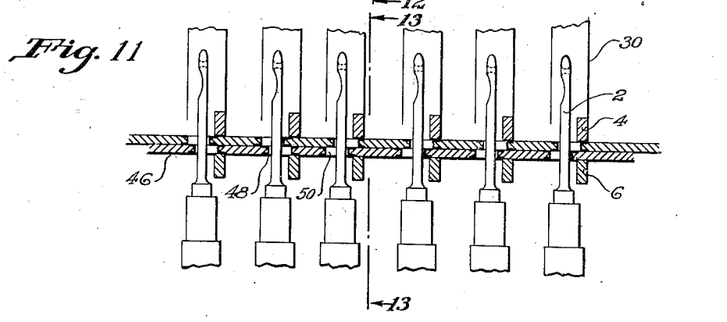
Figure 11 is a similar view illustrating the manner in which the lacing needles subsequently accommodate themselves to the spacing of the eyelets in the upper shown in Figure 10.
Figure 13:
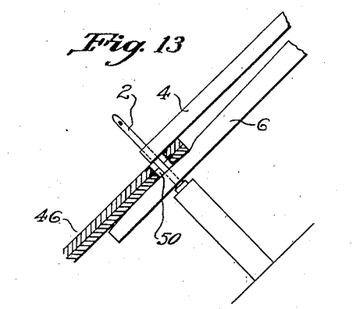
Figure 13 is a similar view of the same parts taken along the line 13—13 of Figure 11.
Figures 14, 15, 16:
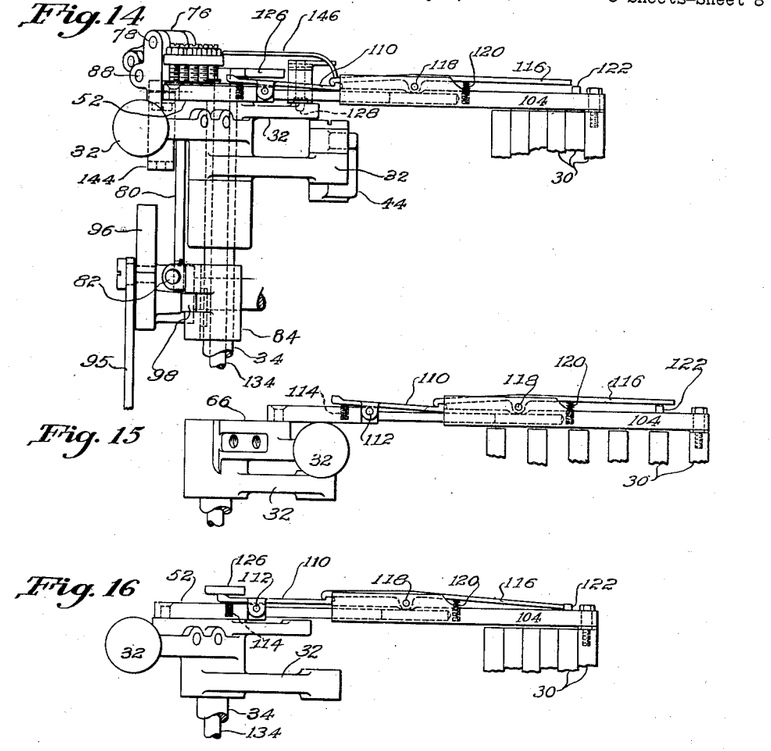
Figure 14 is a detail view in elevation illustrating the means for disabling certain of the spacing connections with the connections in positions assumed when the lacings mechanisms have been brought as close together as possible.
Figure 15 is a similar view indicating the positions of the parts with the lacing mechanisms separated.
Figure 16 is a similar view illustrating the positions of the parts with the lacing mechanisms brought together and certain of the lacing mechanisms disconnected from the spacing connections.

To avoid these difficulties, according to the present invention, the individual lacing mechanisms are permitted to accommodate themselves automatically to any unequal or improper spacing between adjacent eyelets by adjusting the spacing between each pair of adjacent lacing mechanism independently. As shown more clearly in Figures 11 and 13, when the clamping members and clamping jaws are brought together as the machine is started, the upper 46 is straightened and secured in flat condition without causing any tendency in the lacing needles to be thrown out of alignment with the other lacing devices. When the clamping members and jaws are brought together, if there is any extra length of upper material between adjacent eyelets, it causes adjacent needles on which the eyelets are impaled to be spread apart by the action of the eyelets, each lacing frame and the devices carried thereby moving with the needles independently of the other lacing mechanisms. Also, these needles which are held together by eyelets 48 and 50 the distance between which is too short may be adjusted still closer together to relieve any strain transferred to the respective needles by said eyelets. When the individual clamping members and jaws have fully acted to grip the upper, the lacing frames which by this time have become adjusted in proper spaced relation are secured in adjusted positions by the grip on the upper of the clamping members which are mounted in the individual frames.

To render adjacent lacing mechanisms capable of being separated or brought together independently of the spacings between other lacing mechanisms, the spacing mechanism and the lacing mechanisms are disconnected just as the machine is started, and the spacing mechanism is again connected to the lacing mechanisms after the lacing operation is completed and before the machine is brought to rest.

The connections through which the spacing mechanism adjusts the lacing mechanisms are best shown in Figures 6, 7, 9, and 14 to 21, and include links 52, 54, 56, 58, 60 and 62, pivotally connected at equal distances apart to the manually actuated spacing lever 32, the link 62 being pivoted at the center of shaft 34 so that there is no spacing motion imparted to this link. Other links are also similarly connected between the arms 36 and 38 of the spacing mechanism and other points on each lacing mechanism frame 30. To permit the spacing mechanism and the lacing mechanisms to be disconnected the pivots for connecting the links 52 to 60 inclusive to the lever 32 are removable from the links. The removable pivots comprise pins 64 having frustroconically shaped heads movable towards and from similarly shaped seats formed in the links. When the heads of the pins 64 are forced against the links, as in Figure 6, the links are connected to the spacing lever 32 as by a rigid pivot and when the heads of the pins 64 are raised from their seats in the links, as in Figure 7, the links are no longer connected with the spacing lever, but become loose and are permitted to move independently of each other to a limited extent. To prevent the links from becoming entirely displaced when they are disconnected from the spacing lever, the heads of pins 64 are not fully withdrawn from their seats but the lower tips of the heads are allowed to remain below the upper surface of the links so that when the screws are again forced downwardly the conical heads act as wedges to bring the seats in the links back into alignment with the centers of the screws.

The ends of the links 52 to 58 (see Fig. 9) are supported in proper relation to the wedging pins 64 on an upper flat surface 66 of the spacing lever. The link 60, however, is positioned above the link 62 at a slightly higher level than links 52 to 58, and its end is supported on a raised button 68 secured to the surface 66 of the spacing lever. The pin 64 which engages the link 60 is also made somewhat shorter so as to offset the extra height to which the end of the link 60 is raised by the button 68.

To cause all the pins 64 to move towards and to permit them to be raised together from their seats in the links 52 to 60, the pins are adjustably secured in threaded openings in an arm 70 rotatable on a pin 72, the outer ends of which are fixed in upstanding portions of a U-shaped block 74 secured to the spacing lever 32. Between the pin 72 and the pins 64, the arm 70 is engaged by a sleeve-like cam 76 rotatable on a pin 78 mounted above the pin 72 in the block 74. The cam 76 has an arm portion which is pivotally connected to the upper obliquely bent end of a vertical rod 80, the lower end of which is made fast in a pin 82 (see Fig. 14) rotatably mounted in lugs extending from a sleeve 84 surrounding the shaft 34.

Before the machine is started, the sleeve 84 is raised in a manner to be described, by downward movement of the treadle connected rod 20 to move the high portion of the cam 76 away from the arm 70 which carries the disconnecting pivot pins 64. This movement of the cam releases the pressure of the pins 64 against their seats in the links and effectively disconnects the links so as to permit independent movement of the lacing mechanism frames 30. The sleeve 84 is held raised during operation of the machine. At the end of the lacing operation, while the driving and stopping mechanism is acting to bring the machine to rest, the sleeve 84 is again lowered, pressing the cam 76 against the arm 70 and forcing the pins 64 into their seats in the links 52 to 60. When the heads of pins 64 are forced into their seats in the links, the lacing frames and the needles are drawn back into equally spaced relations so that the spacing mechanism again may act to change the distances between the lacing mechanisms equally.

To insure that the spacings between the frames 30 of the lacing mechanisms in the present machine will be adjusted automatically by the action of the eyelets before the upper is gripped by the individual clamping members 4 and 6, the wedging pins 64 are released from their seats in the ends of the spacing links 52 to 60 inclusive, by connections actuated by that part of the downward movement of a single control arm 86 of the driving and stopping mechanism hereinafter described which is caused by the action of the treadle rod 20. These connections include a link 88 connected at one end on a pin 90 carried by the control arm 86 and at the other end on a pivot 92 carried by an arm 93 secured to a horizontal shaft 196 which passes from the right side of the machine through the frame to the left side. At the left side of the machine the shaft 196 carries an arm 94 having pivotally connected to it one end of a link 95 (see Fig. 1) the other end of which is pivotally connected to a cam 96 rotatable on a shaft 97, which cam operates the clamp jaw 8 just before the machine starts as fully explained in applicant's patent No. 2,106,320 hereinbefore referred to. At the same time that the clamping jaw 8 is actuated, a stud 98 extending from the cam 96 (best shown in Figure 14) into a slot in the sleeve 84 which is connected with the cam 76, raises the sleeve and releases the pressure of the wedging pins 64 against their seats in the connecting links. The lacing frames are then free to move independently when the upper is being gripped by the clamping members. During further downward movement of the control arm 86, the sleeve 84 is raised still further, but without any further effect on the wedging pins 64 due to the shape of the cam 76 which actuates the arm 70 for supporting the wedging pins.

Connections between the three points on the frames of the first three lacing mechanisms and the spacing mechanism including lever 32 and arms 36 and 38 are similar to each other with the exception that the pivots for the connections to arms 36 and 38 are in the form of rigid pins. It has been found that it is unnecessary to disconnect the links between the lacing frames and the arms 36 and 38 in order to render the lacing needles capable of being adjusted independently of the spacing mechanism, the points of connection with the lacing frames being so remote from the needles that sufficient independent movement of the needles is obtained for all practical variations in spacing between eyelets of the same upper.

Figure 1:
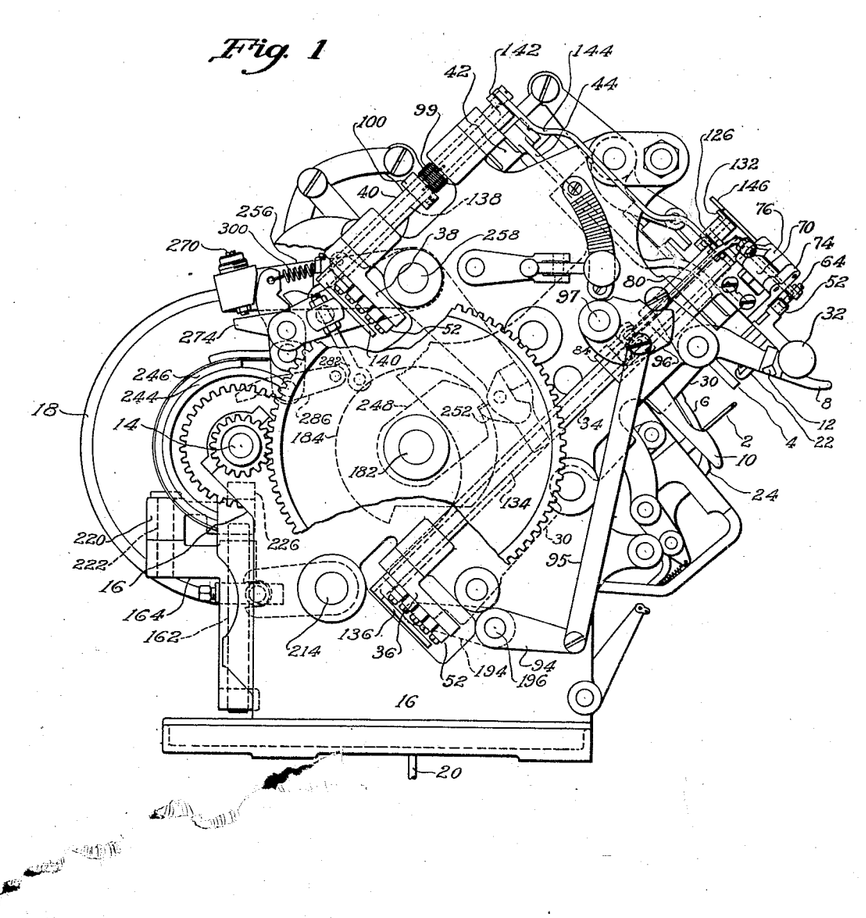
Figure 1 is a view in left hand side elevation of a lacing machine embodying the features of the present invention.

To overcome an inherent tendency of the lacing frames in the present machine to be thrown together during lacing operations, there is mounted on the shaft 40, see Fig. 1, at the rear of the machine a coiled spring 99 having one end located in a perforation in the bearing for the shaft 40, and the other end secured in a collar 100 fixed to the shaft.

The machine disclosed in the patent is constructed with six individual lacing mechanisms, and it frequently is found unnecessary to apply as many lacings to an upper. To render certain unused lacing mechanisms inoperative, the needles are removed from the needle bars 40 and the rearward end of each movable clamping member 6 is so connected to the clamp operating mechanism as to permit the member to remain idle while the other clamping members operate. The means for holding each clamping member 6 idle comprises a manually operated arm 101 (see Fig. 8) having a shoulder arranged to slide beneath a clamp operating rod 102. The arm 101 may be rotated about a pivot on the clamping member 6 to move the shoulder on the arm away from beneath the rod so that when the rod is moved downwardly to actuate the clamping members the particular clamping member 6 will not be raised against the upper, all as fully illustrated and described in applicant's prior patent hereinbefore referred to.

When only a few of the lacing mechanisms are used, the frames and portions of the lacing devices of the inoperative mechanisms in the patented machine may interfere with the proper manipulation of the upper by the operator in presenting it to the machine, particularly when lacing high-cut uppers. In a high-cut upper the leg covering portion of the upper is not laced, but projects towards the rear of the machine against the frames of unused lacing mechanism. In order to prevent unused lacing mechanisms from interfering with the manipulation of a shoe upper, in the present machine the spacing connections for the unused lacing mechanisms are disabled and the unused lacing mechanisms are moved close to each other and to the nearest lacing mechanism which remains operative.

To disable the spacing connections for the inoperative lacing mechanisms the ends of links 52, 54 and 56 are slidably mounted in openings in the sleeve-like ends of a series of bars 104, 106 and 108 which, in turn, are pivotally connected to the upper parts of the individual lacing frames and form with the links 52, 54 and 56 the spacing connections between the spacing lever and the lacing frames. When the links and bars are connected together, as hereinafter described, they act as rigid connections and when disconnected, the links telescope with the bars without causing a relative spacing movement between the lacing frames.

To prevent the links from telescoping with the bars when the lacing frames 30 are being moved to the right, the links 52, 54 and 56 each have a latch lever 110 fulcrumed on a pin passing through the respective link and arranged normally to engage the ends of bars 104, 106 and 108 respectively. To hold the latch levers 110 in engagement with the ends of the bars, there are mounted in passages formed in the links 52, 54 and 56 compression springs 114 for rocking the latch levers about the pins 112. When the links 52, 54 and 56 are being moved to the left, the bars 104 are also moved to the left by the engagement of the latch levers 110 formed with shoulders cooperating with the hooked portions of a series of pawl levers 116 fulcrumed on pins 118 passing through flanges rising from the sides of the bars 104, 106 and 108. The hooked portions of pawl levers 116 are held yieldingly against the latch levers 110 by means of springs 120 secured between the pawl levers and the bars on which they are fulcrumed.

When a spacing connection is to be disabled, the latch lever of the connection is raised out of engagement with the end of the corresponding bar so that, when the lacing frames 30 are next moved to the right, the latch lever which is raised from the connection bar will slide under the pawl lever without actuating the bar. The link and bar are thus disconnected and the corresponding frame is then moved by contact with an adjacent frame. To return the disconnected frame to the left, the pawl levers are bent to be engaged by stops 122 on the next bar 106 or 108 to the rear. The last connected bar returns the adjacent connected bar and that, in turn, returns the next bar. The link 58 also carries at its right end a stop 124 in proper position to be engaged by the pawl lever 116 which is mounted on the third bar 108 so that the third and fourth lacing frame from the right may be returned to the left together.

In order to disable the connections for the desired number of the lacing frames, the left ends of the latch levers 110, as shown in Figures 14 to 17 inclusive, are formed with beveled enlargements cooperating with step-like cam portions on one arm of a manually actuated lever 126 by means of which the left ends of the latch levers 110 successively are forced downwardly against the springs 114. At the same time the pawl levers 116 are rocked on the fulcrum pins 118 so as to engage the stops 122 or 124. To hold the disabling lever 126 in the position to which it is moved, the manually operated arm of the lever carries a spring pressed plunger or detent 128 which engages one of a series of openings 130 in one arm of the spacing lever 32. On the upper end of the plunger 128 is secured a plate 132 having a laterally extending tab portion by means of which it can readily be lifted by the operator to withdraw the plunger from one of the openings 130.

In the machine illustrated only the three lacing mechanisms at the right are arranged to have their spacing connections disabled in the manner just described. The connecting links 58, 60 and 62 therefore are integral from their points of attachment to the spacing lever 32 to the frames 30 of the respective lacing mechanisms.

To disable simultaneously the spacing connections between the spacing mechanism and each lacking frame 30 at all of the three points to which they are connected, the disabling lever 126 is secured to the upper end of a shaft 134 (see Fig. 1) passing through the hollow shaft 34 and having at its lower end a cam arm 136 provided with step-like offsets arranged to cooperate with bevelled enlargements on latch levers similar to those on levers 126. These latch levers are mounted on links similar to the links 52, 54 and 56 which connect the arm 36 to the forward part of the lacing frames 30. These latch levers cooperate with the ends of bars similar to the bars 104, 106 and 108 within which the links are slidable. Within the hollow adjusting shaft 40 also there is a shaft 138 having at its lower end a cam arm 140 similar to the arm 136 and at its upper end an arm 142 is pivotally connected by means of a link 144 with a third arm of the disabling lever 126, the arrangement being such that the disabling lever 126 and arms 136 and 140 move simultaneously. The cam arm 140 also acts against a series of latch levers constructed similar to those against which the lever 126 acts. The offset portions in the cam arms of disabling lever 126 and of the arms 136 and 140 are so proportioned that when the disabling lever is moved, the latches 110 will be operated successively and the openings 130 in the spacing lever 32 are so located that the disabling lever 126 may be held in a position where two, three or four of the lacing frames may be moved in a group when the spacing mechanism is actuated.

To insure that none of the spacing connections will be disabled when the lacking frames are separated, so as to be in a position where they cannot be secured to an adjacent lacing frame, the disabling lever 126 is locked to the spacing lever 32 except when all of the frames of the lacing mechanisms are brought together. To lock the disabling lever 126 to the spacing lever 32, when the lacing frames are separated, connecting link 60 for the second lacing frame from the left has secured to it a guard finger 146 (see Figs. 18 to 21) having an arcuately curved upstanding end arranged to pass over the upper surface of the plate 132 so that the plunger 128 may not be withdrawn from the opening 130 in which it is held when the spacing lever 32 is moved to separate the lacing mechanisms.

Figure 17:
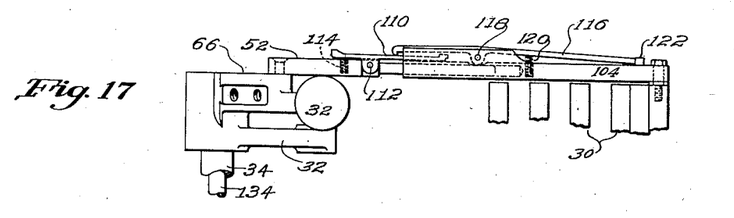
Figure 17 is a similar view of the same parts illustrating the positions assumed with the lacing mechanisms spread apart and showing three of said mechanisms connected together.
Figure 18:
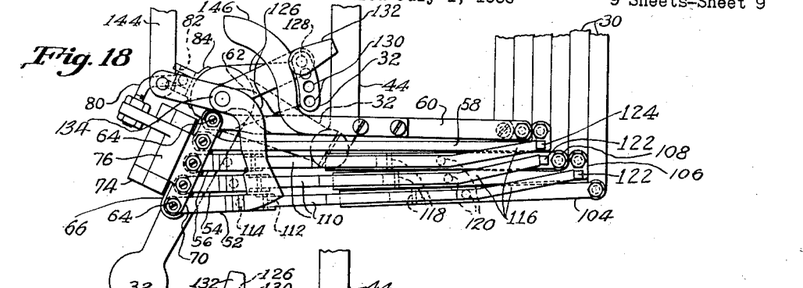
Figure 19:
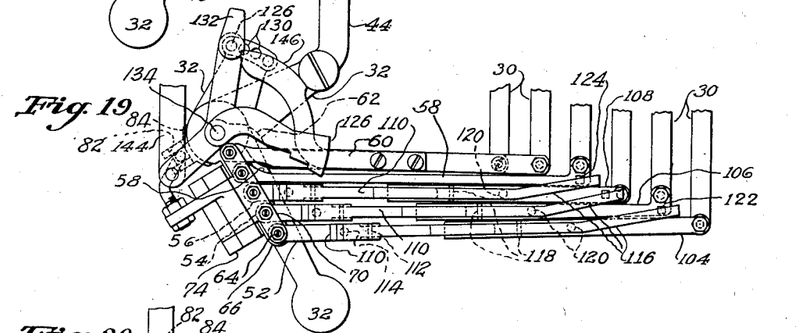
Figures 20, 21:
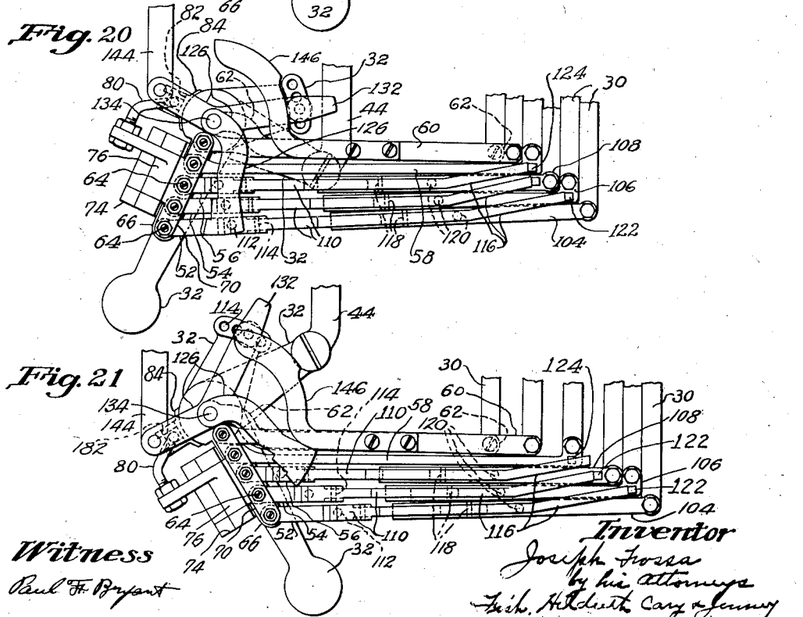

When the spacing lever 32 is moved to adjust the distances between the lacking frames, the cam arm of the disabling lever 126 moves away from the latch levers 110 which maintain the links 52, 54, and 56 connected to the bars of the spacing connections, due to the swinging movements of the links about their pivotal connection with the spacing lever 32. However, at the time the cam arm of the disabling lever 126 is moved away from the latch levers 110, the latch levers have already been disengaged from the ends of the bars connecting inoperative lacing frames and the corresponding latch levers have moved along the upper surfaces of the sleeve-like portions of the bars, as indicated in Figure 17. When the spacing lever is moved to bring the lacing frames together again, the cam arm of the disabling lever 126 again acts on the latch levers so that the connections for which the disabling lever is adjusted to act upon will remain disabled. While the latch levers 110 slide along the upper surfaces of the sleeve-like portions of the connection bars, they hold the left ends of the pawl levers raised so that the right ends will not be disengaged from the stops 122 or 124. Thus, no change in the operation of the spacing connections results from the movement of the cam arm of disabling lever 126 away from latches 110 during spacing adjustments.

Figure 2:
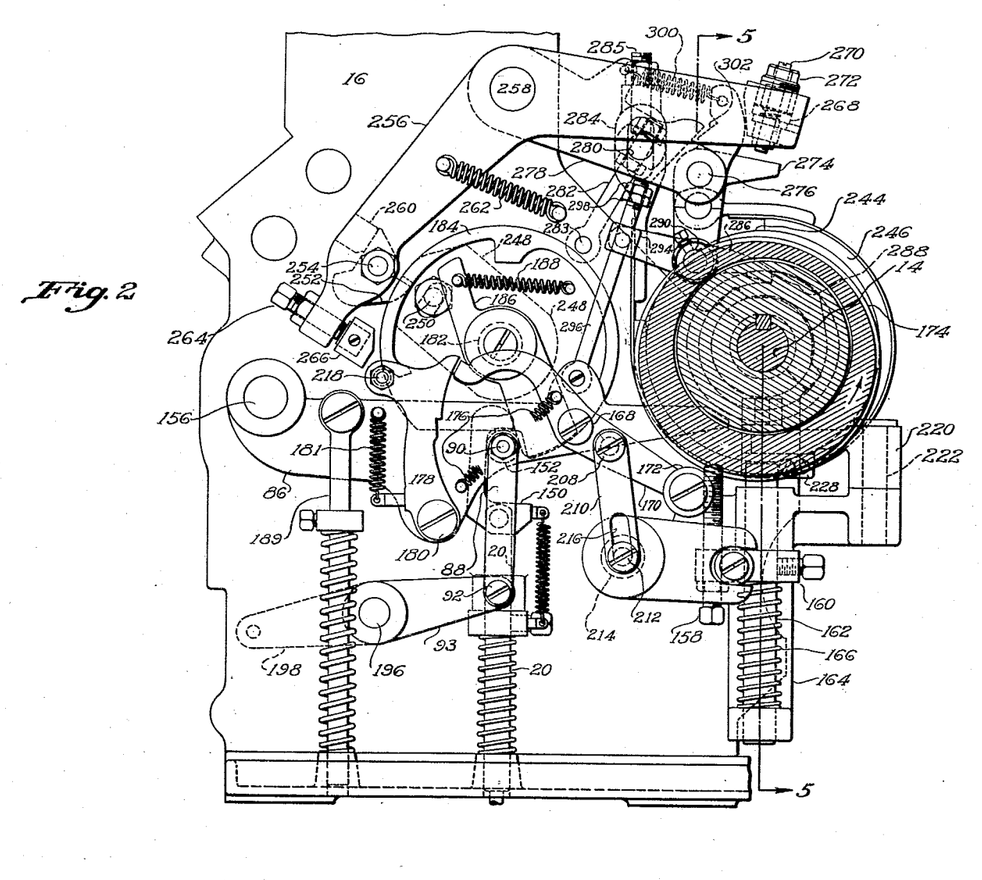
Figure 2 is a view in elevation looking from the right, partly in section, of a portion of the machine illustrating certain parts of the driving and stopping mechanisms shown in stopped positions.

The driving and stopping mechanism for the machine of inventor's prior patent is provided with a control arm which is actuated in part by the treadle rod and in part by power operated mechanism to start the machine in operation. This control arm is similar to the arm 86 of the present machine as illustrated in Figures 2, 3, 4, and 5. The control arm 86 is connected to the treadle actuated rod 20 by a hook member 150 pivotally mounted at the upper end of the treadle rod, having its hooked portion engaged with a roll 152 rotatable on the pin 90 on the control arm 86. The control arm 86 is fulcrumed on the end of a shaft 156 secured in the machine frame, and at its opposite free end is arranged to engage the upper end of a set screw 158 threaded into a block 160 clamped to a vertically slidable clutch controlling rod 162. The rod 162 passes through bearings in a bracket 164 and is urged to a raised position by a coil spring 166 surrounding the rod between the lowermost bearing of the bracket 164 and the block 160. When the rod 162 is forced downwardly, the driving pulley 18 is connected to the main driven shaft 14 of the machine. While the machine is at rest, the control arm is held raised some distance above the screw 158 as illustrated in Figure 2.

To relieve the operator of the necessity for overcoming the force of the spring 166, as well as the resistance offered by other portions of the driving and stopping mechanism which are actuated by the control arm 86, the control arm has a stud screw 168 threaded therein on which is mounted a cam lever 170 having a roll 172 arranged to engage a cam 174 rotating with the main driving pulley 18. To hold the cam roll 172 against the surface of cam 174, a tension spring 176 is stretched between a pin on the lever 170 and a pin on the control arm 86. The end of the cam lever 170 opposite the roll 172 cooperates with a latch member 178 pivotally mounted at its lower end on a screw 180 secured in the control arm 86. The latch member 178 is normally urged towards the cam lever by a spring 181 stretched between the arm 86 and the latch member, but is held from engaging the cam lever while the machine is stopped. The arrangement is such that when the treadle rod 20 is depressed, the free end of the control arm 86 is lowered nearly to the point of engaging the cam lever 170 and the cam lever which is being continuously oscillated by the cam 174 is latched to the arm 86 so that further movement of the cam lever by the cam will cause the control arm 86 to be forced downwardly against the screw 158, the control rod 162 to be depressed against the spring 166, and other operations incidental to starting the machine performed. It will be noted that the only effort required by the operator when depressing the treadle rod is to bring the control member idly to a lower position from that shown in Figure 2. Thereafter the machine is started by power derived from the main driving pulley 18.

When the control arm 86 is forced downwardly against the screw 158 sufficiently to operate the control rod 162, it is held for six rotations of the shaft 14 and thereafter the control arm is allowed to rise and the machine brought to rest. To hold the control arm is lowered position while the machine is operating, there is provided a shaft 182 geared to be driven from the shaft 14, one revolution for each six revolutions of the shaft 14. At the right end of the shaft 182 there is secured a one-revolution stop cam 184 having a recessed portion arranged to receive the roll 152 on the control arm 86 when the control arm is in raised position. When the control arm is moved to cause the machine to start its operation, a lever 186 rotatably mounted at the end of the shaft 182 moves above the roll 152 in its lowered position and prevents it from again rising until the cam 184 has moved its outermost surface into engagement with the roll. The stop cam 184 then holds the control arm lowered until the recessed portion of the cam is again reached. As the roll enters the recess, it strikes the side of the lever 186 and forces it to one side, against the tension of a spring 188 stretched between the upper end of the lever 186 and the stop cam. The driving and stopping mechanism thus far described is substantially the same in construction and manner of operation as in the machine of inventor's patent above identified. However, in the machine of the patent, the control arm is raised from the set screw 158 by a spring coiled about the hub of the arm and in the present machine the control arm is held raised by a spring pressed rod 189 pivotally connected to the control arm.

In inventor's patented machine, so long as the main driving pulley 18 is being rotated, the cam lever 170 oscillates continuously on the stud screw 168, thus causing constant vibration and wear, even while the machine is idle. When the roll 172 and cam 174 or the fulcrum for the lever 170 become slightly worn, undesirable noise or improper adjustment of the parts may result. To avoid frequent adjustments in attempting to overcome these difficulties, the cam lever 170 in the present machine is held from oscillation while the machine is not operated.

To hold the lever 170 from oscillation between the times in which the present machine is operated, the lever 170 has pivotally connected at 208 the upper end of a restraining link 210, the lower end of which is loosely supported on a screw 212 threaded into the center of a shaft 214 mounted in bearings in the machine frame so that the screw 212 is held stationary. The lower end of the restraining link 210 is formed with a slot 216 of sufficient length to accommodate the entire movement imparted to the cam lever 170 by the cam 174. When the treadle rod 20 is depressed, the fulcrum screw 168 of the lever 170 is moved downwardly with the control arm 86 on which it is mounted, and the cam roll 172 moves from the position shown in Figure 2 to that illustrated in Figure 3. The resulting movement of the cam lever 170 causes the distance between the pivot 208 of the link 210 and the screw 212 to be so shortened that the end of the slot 216 no longer holds the cam roll 172 away from the cam 174. At the same time that the control arm is moved downwardly, the latch member 178 engages the cam lever 170 so that the cam lever is latched to the control arm 86 and, as the cam 174 rotates, the control arm will be actuated in the desired manner.

In the prior machine, the latch member 178 is not moved away from the cam lever until just before the machine stops, so that the cam lever rubs against the latch member during operation of the machine. In the present machine the latch member is provided with a rearwardly projecting pin 218 arranged in the path of the lever 186 and of a flanged rim formed on the cam 184. The rim on the stop cam 184 extends throughout the greater part of the circumference of the cam so that the time during which the end of the cam lever may rub against the latch 178 is greatly reduced.

The controlling rod which is lowered by the operation of the control member in the prior machine operates directly in a cam slot formed in a sleeve or hub portion of a driven clutch member rotating with the main driving shaft. When the controlling rod is raised, the pulley which forms the driving member of the clutch is disconnected from the main shaft and a brake is applied to stop the machine. In the present machine, the upper end of the controlling rod 162 does not directly engage a cam slot, but acts only to stop the oscillation of an arm 220 which is oscillated about a vertical pin 222 by a cam slot in a clutch sleeve 224 (see Fig. 5) during operation of the machine. The lower end of the pin 222 is secured in an arm of the bracket 164. The arm 220 at its free end is provided with a cam slot engaging roll 226 and is formed with a downwardly extending shoulder having a replaceable wear plate 228 along which the upper cut-away end of the controlling rod 162 slides to lock the oscillating arm 220 from movement. The roll 226 in the illustrated machine cooperates with a cam slot formed in the sleeve 224 which is keyed to, but slidable lengthwise of the main shaft 14. The hub of the driving pulley 18 has a bearing on the outer surface 230 of the sleeve 224, but is held from movement along the shaft 14 with the sleeve by a collar 232 secured to the driving pulley 18 and arranged to ride in a groove between a shouldered bushing 234 and a nut 236 secured to the end of the shaft 14. Extending radially from the sleeve 224 of the clutch sleeve is a flange, one surface of which may be pressed against a layer of friction material 238 secured within an under-cut radial part of the driving pulley 18 and to prevent the entrance of foreign substances between the engaging surfaces of the flange on the sleeve and the friction material 238, the space within the under-cut portion of the driving pulley is enclosed by a circular plate 240 having a central opening and forming a support for the cam surface 174. When the controlling rod 162 is withdrawn from the wear plate 228 on the arm 220, the flange of the sleeve 224 is forced by a spring 242 against the friction material 238 to clutch the driving shaft 14 to the driving pulley. The spring 242 is coiled around the shaft 14 within an enlarged opening in the sleeve 224 and acts against a shoulder formed at the end of the opening in the clutch sleeve 224 at one end and at the other end against a similar shoulder formed in an opening within the hub of a brake drum 244 secured to the shaft. When the controlling rod locks the arm 220 in position, the spring 242 is compressed and the pressure of the flange on the sleeve 224 against the friction material 238 is relieved. A brake band 246 is then tightened against the brake drum 244 to bring the driving shaft 14 to rest at a predetermined angular position.

The brake band of inventor's prior machine is actuated directly by an enlargement on a cam surface of the sleeve which corresponds in the present machine with the sleeve 224. Due to the weight of the parts, and the speed at which the machine operates, it has been found difficult to so adjust the brake that the driving shaft will be brought to rest by this arrangement accurately and uniformly at the desired position.

Figure 3:
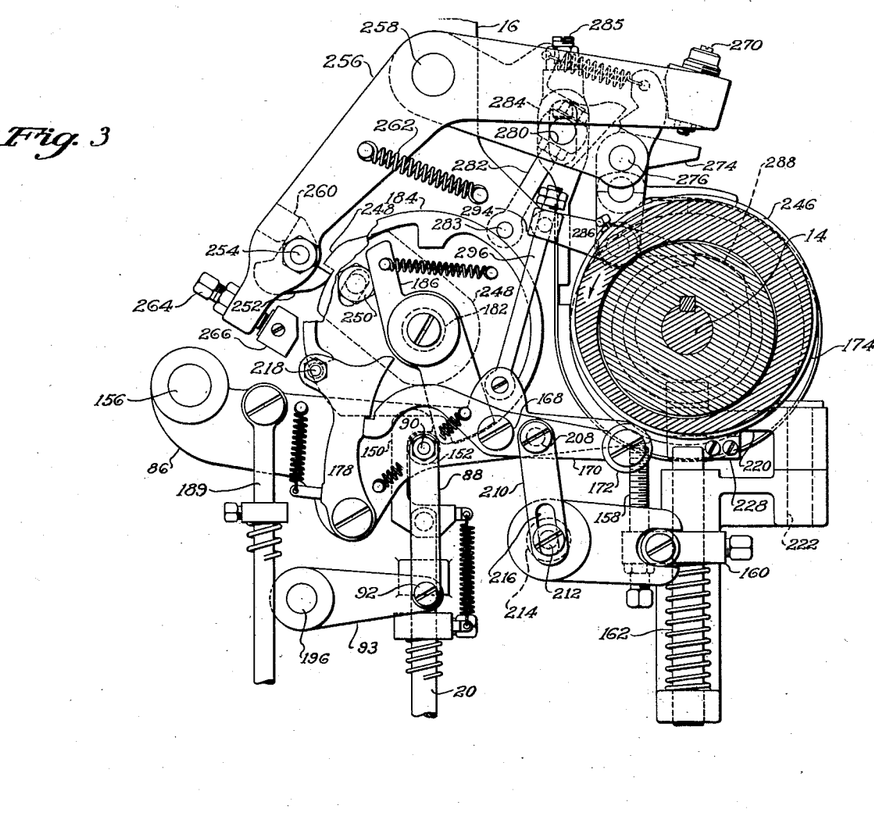
Figure 3 is a detail view, partly in section, of the same parts of the driving and stopping mechanism shown in starting positions.

The driving and stopping mechanism in which the braking means comprising a feature of the present invention is embodied is arranged to be operated in part by the one-revolution stop cam 184 when the main driving pulley 18 is disconnected from the driving shaft to cause a preliminary light yielding braking effort, first to be exerted and then at a predetermined point in the rotation of the main shaft a positive braking effort of increasing force to be exerted to bring the shaft 14 quickly to rest. Secured to the rear surface of the stop cam 184, as illustrated in Figures 2 and 3, is a plate 248 having a projection for causing the brake band 246 to be tightened with a preliminary yielding tension before the main shaft 14 of the machine has reached its stopping position. The plate 248 is rotatably mounted on the one-revolution shaft 182 and secured adjustably in a suitable angular relation with the stop cam by a cap screw 250 passing through a slot in the stop cam and into a threaded opening in the plate 248. Cooperating with the projection on the plate 248 is a three-pointed follower 252 rotatably mounted on a bolt 254 passing through one arm of a braking lever 256 which, in turn, is fulcrumed on a shaft 258 secured in the frame of the machine. The follower 252 is so arranged that during normal rotation of the stop cam, one point is held in the path of the projection on the plate 248 and another point of the follower is held against a lug 260 on the lever 256 by the movement of the plate along the surface of the follower. The projection on the plate 248 is formed with a gradual incline on one side and a shoulder on the other, so that the follower will drop quickly off at the end of the preliminary braking operation. If the machine should be reversely rotated manually or otherwise, the shoulder on the plate 248 may strike the point of the follower 252 and rotate the follower on the bolt 254 without actuating the braking lever 256. Breakage or jamming of the parts is thus avoided. The third point of the follower 252 is for the purpose of preventing movement of the follower about its pivot bolt 254 to a position where it will be out of the path of the projection on the plate 248. To this end it is arranged when rotated to strike the lug 260. To return the braking lever to its inoperative position and to hold the follower against the plate 248, there is a spring 262 connected between the lever and a pin on the frame of the machine, and the movement of the brake lever by the spring is limited by engagement of a set screw 264 on the lever with a block 266 also secured to the machine frame.

To cause the brake to be yieldingly applied when the braking lever 256 is actuated by the plate 248, the lever 256 has at the end of its rearwardly projecting arm a boss having a threaded opening 268 in which is slidably mounted a spring pressed pin 270. The spring pressure of the pin 270 is arranged to be suitably adjusted by rotating a sleeve 272 threaded in the opening 268 through which the pin 270 passes.

The lower end of the pin 270 is located above one arm of a brake band actuating bell crank 274 fulcrumed on a pin 276 secured in a stationary forked arm 278, one end of which is mounted on the shaft 258. To hold the arm 278 stationary, there is a headed rod 280 passing through the forked portions of the arm 278, and a threaded link 282 pivoted at its lower end at 283 on the machine frame passes through an opening in the head of rod 280 and has nuts on its threaded upper end by means of which the arm is adjustably secured in place. When the braking lever 256 is rocked to cause the pin 270 to engage the brake supporting bell crank 274, one end of the brake band 246 which is pivotally connected to the bell crank 274 is yieldingly tightened against the brake drum 244, the other end of the brake band being connected with the arm 278. To provide means for adjusting the brake band, the said other end of the band is made fast to a slotted bar 284 surrounding the rod 280 between the forked portions of the arm 278, and a set screw 285 in the bar 284 bears against the rod to give a tighter or looser adjustment. As soon as the projection on the plate 248 allows the follower 252 on the braking lever 256 to drop off the shoulder on the plate, the yielding application of the brake is terminated and the brake is thereafter applied with a positive increasing effort until the main shaft 14 stops.

Figure 5:
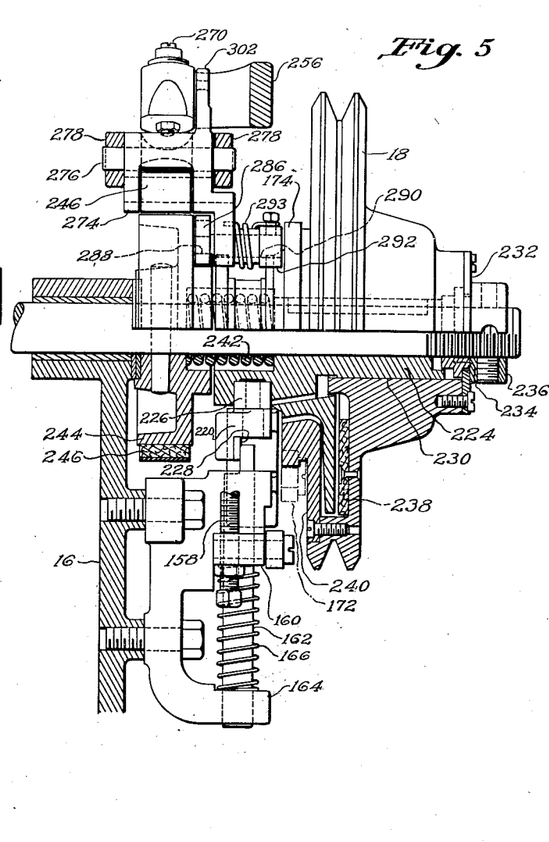
Figure 5 is a sectional view of a portion of the driving and stopping mechanism taken along the line 5—5 of Figure 2.
Figure 6:
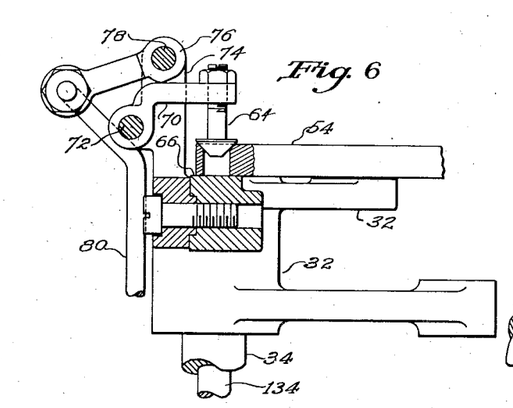
Figure 6 is a detail view on an enlarged scale, partly in section, of certain disconnectible connections of the spacing mechanism shown in connected relation.
Figure 7:
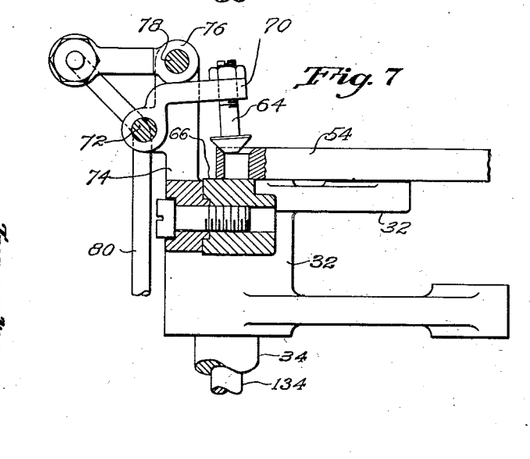
Figure 7 is a similar detail view of the same parts shown in disconnected relation.

To apply the brake positively with increasing force, just as the main shaft 14 reaches its stopping position, the brake band actuating bell crank 274 has pivotally mounted at the lower end of its brake band supporting arm, a pawl 286 cooperating with an abutment 288 projecting from the hub of the brake drum 244 (see Fig. 5). The pawl 286 is fixed to one end of a pin 290 rotatable in a projecting bearing on the bell crank 274 and the other end of the pin has secured to it a collar 292. To hold the pawl yieldingly in the path of the abutment 288, the bearing for the pin 290 is surrounded by a coil spring 293, one end of which is secured in the arm of bell crank 274 and the other end secured to the collar 292.

Figure 4:
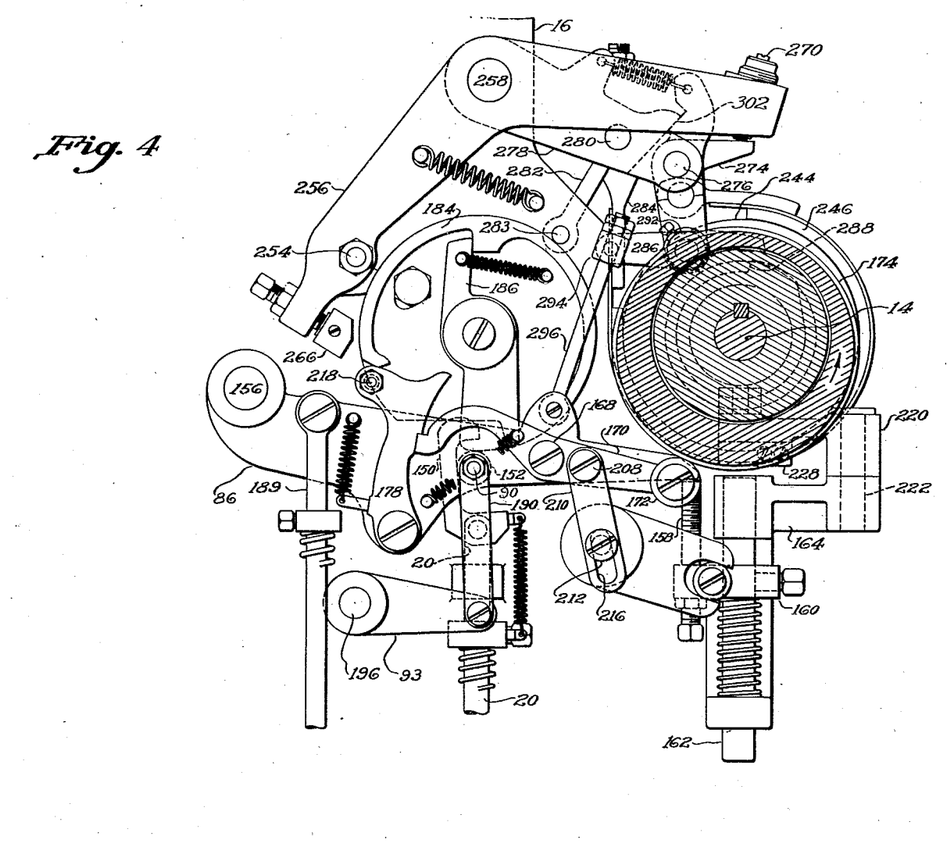
Figure 4 is a similar view of the same parts illustrating the positions assumed subsequently to those shown in Figure 3.

While the machine is running, the pawl is held out of the path of the abutment 288. Pivotally mounted on an arm connected with the pawl 286 is a perforated block 294 through which the upper end of a link 296 slides. The lower end of the link 296 is pivotally connected to the control arm 86. When the control arm 86 is drawn downwardly by the treadle rod 20, the link 296 moves idly through the block 294 until the end of the arm 86 engages the set screw 158. When the cam lever 170 is latched to the control arm, the block 294 is engaged by one of a pair of lock nuts 298 threaded at the upper end of the rod 296 which causes rotation of the pawl 286 in a direction to withdraw it from the path of the abutment 288. This occurs at the same time that the controlling rod 162 is lowered so that the brake band 246 is released from the brake drum 244 before the driving pulley 18 is clutched to the shaft 14. To hold the brake band yieldingly away from the drum when the pawl is disengaged from the abutment 288, there is provided a third arm on the bell crank 274 between which and a lug on the arm 278 there is stretched a spring 300. While the machine is running, the bell crank 274 is held from further yielding movement by the engagement of opposing surfaces 302 on one arm of the bell crank and on the arm 278, respectively, as shown in Figure 4.

The driving and stopping mechanism herein disclosed forms the subject-matter of a divisional application Serial No. 334,398, filed May 10, 1940.

The nature and scope of the invention having been indicated, what is claimed is:

1. A machine for lacing eyeletted shoe uppers having, in combination, a main operating shaft, a plurality of lacing mechanisms, operated by said shaft including needles upon which the eyelets of an upper are impaled, and clamping members for gripping the upper close to the eyelets impaled by the needles, spacing connections between the lacing mechanisms, and control connections arranged when thrown into operation to cause the lacing mechanisms to be disconnected from the spacing connections and then to cause the clamping members to grip the upper.

2. A machine for lacing eyeletted shoe uppers having, in combination, a main operating shaft, a plurality of lacing mechanisms operated by said shaft including needles upon which the eyelets of an upper are impaled, and clamping members for gripping the upper close to the eyelets impaled by the needles, spacing connections between the lacing mechanisms, and a control member for the operating shaft arranged when thrown into operation to cause the lacing mechanisms to be disconnected from the spacing connections, then to cause the clamping members to grip the upper and, after the lacing operation is completed, to cause the lacing mechanisms again to be connected with the spacing connections.

3. A machine for lacing eyeletted shoe uppers having, in combination, mechanism including eyelet engaging devices for lacing a series of eyelets in an upper, means for spacing said devices prior to impaling an upper comprising connections between the lacing mechanisms and wedging members in the joints of the connections for rendering the eyelet engaging devices capable of being separated independently of each other when the wedging members are withdrawn from the joints in said connections.

4. A machine for lacing eyeletted shoe uppers having, in combination, a plurality of mechanism including eyelet engaging devices for lacing a series of eyelets in an upper, means for spacing said devices prior to impaling an upper comprising connections between the lacing mechanisms, wedging members in the joints of the connections for rendering the eyelet engaging devices capable of being separated independently of each other when the wedging members are withdrawn from the joints, and means for actuating the wedging members simultaneously towards and from the joints.

5. A machine for lacing eyeletted shoe uppers having, in combination, mechanism including eyelet engaging devices for lacing a series of eyelets in an upper, means for spacing said devices prior to impaling an upper comprising connections and wedging members in the joints of the connections, and means for withdrawing the wedging members after impaling an upper and for forcing the weidging members into the joints of the connections after the lacing operations are completed.

6. A machine for lacing eyeletted shoe uppers having, in combination, a mechanism including eyelet engaging devices for lacing a series of eyelets in an upper, means for spacing said devices prior to impaling an upper comprising connections and conical pivots in the joints of the connections, and means for withdrawing the pivots to render the eyelet devices capable of being separated independently of each other.

7. A machine for lacing eyeletted shoe uppers having, in combination, a plurality of mechanisms including eyelet engaging devices for lacing a series of eyelets in an upper, means for rendering one or more of the lacing mechanisms inoperative, spacing connections between the lacing mechanisms for changing the distances between the lacing mechanisms and means acting on the spacing connections for disabling the spacing connection for the inoperative lacing mechanisms while the spacing connections for operative lacing mechanisms remain effective.

8. A machine for lacing eyeletted shoe uppers having, in combination, a plurality of mechanisms including eyelet engaging devices for lacing a series of eyelets in an upper, means for rendering one or more of the lacing mechanisms inoperative, spacing mechanism connected to the lacing mechanisms for effecting a simultaneous space adjustment of the lacing mechanisms, and means acting on the spacing connections for disabling the spacing connections to the inoperative lacing mechanisms and for maintaining the inoperative lacing mechanisms close to each other and to the nearest operative lacing mechanism.

9. A machine for lacing eyeletted shoe uppers having, in combination, a plurality of mechanisms including eyelet engaging devices for lacing a series of eyelets in an upper, means for rendering one or more of the lacing mechanisms inoperative, spacing connections between the lacing mechanisms for changing the distances between the lacing mechanisms and means acting on the spacing connections for disabling the spacing connections for the inoperative lacing mechanisms while the spacing connections for the operative lacing mechanisms remain effective and for securing the inoperative lacing mechanisms together for movement with one of the operative lacing mechanisms when the spacing connections are actuated.

10. A machine for lacing eyeletted shoe uppers having, in combination, a plurality of mechanisms including eyelet engaging devices for lacing a series of eyelets in an upper, means for rendering one or more of the lacing mechanisms inoperative, spacing connections between the lacing mechanisms for changing the distances between the lacing mechanisms, means for disabling the spacing connections for the inoperative lacing mechanisms, and means for preventing the number of disabled spacing connections from being changed until the lacing mechanisms are moved to predetermined positions.

11. A machine for lacing eyeletted shoe uppers having, in combination, a plurality of mechanisms including eyelet engaging devices for lacing a series of eyelets in an upper, means for rendering one or more of the lacing mechanisms inoperative, spacing connections between the lacing mechanisms for changing the distances between the lacing mechanisms, means for disabling the spacing connections for the inoperative lacing mechanisms and for securing the inoperative lacing mechanisms together, and means for preventing the number of disabled spacing connections from being changed until all of the lacing mechanisms have been brought together.

12. A machine for lacing eyeletted shoe uppers having, in combination, a plurality of mechanisms including eyelet engaging devices for lacing a series of eyelets in an upper, spacing connections including latches between the lacing mechanisms for changing the distances between the lacing mechanisms, a cam lever for actuating the latches to disable selectively the spacing connections, and means for preventing the relative position of the cam lever from being changed until the lacing mechanisms are moved to predetermined positions.

13. A machine for lacing eyeletted shoe uppers having, in combination, a plurality of mechanisms including eyelet engaging devices for lacing a series of eyelets in an upper, spacing connections including latches between the lacing mechanisms for changing the distances between the lacing mechanisms, a cam lever for actuating the latches to disable selectively the spacing connections, a detent for holding the cam lever in relatively fixed adjusted position, and a guard plate arranged to lock the detent from releasing the cam lever until the lacing mechanisms are moved to predetermined positions.

14. A machine for lacing eyeletted shoe uppers having, in combination, a plurality of lacing mechanisms including needles upon which the eyelets of an upper are impaled, driving means for the lacing mechanisms, treadle operated connections for controlling the driving means, spacing connections between the lacing mechanisms for changing the distances between said mechanisms, and means actuated through the treadle operated connections for disconnecting the spacing connections from the lacing mechanisms and for reconnecting the spacing connections with the lacing mechanisms when the driving means for the lacing mechanisms is brought to rest.

15. A machine for lacing eyeletted shoe uppers having, in combination, a plurality of lacing mechanisms including needles upon which the eyelets of an upper are impaled, driving means for the lacing mechanisms, treadle operated connections for controlling the driving means, spacing connections between the lacing mechanisms for changing the distances between said mechanisms, means actuated through the treadle operated connections for disconnecting the spacing connections from the lacing mechanisms, clamping members in each lacing mechansm for gripping the upper when the driving means begins to operate, and means for holding the disconnecting means in disconnected position until the lacing operations are completed.

16. A machine for lacing eyeletted shoe uppers having, in combination, a plurality of lacing mechanisms including needles upon which the eyelets of an upper are impaled, driving means for the lacing mechanisms, treadle operated connections for controlling the driving means, spacing connections between the lacing mechanisms for changing the distances between said mechanisms, means actuated through the treadle operated connections for disconnecting the spacing connections from the lacing mechanisms, clamping members for securing each lacing mechanism against spacing movements relatively to other lacing mechanisms when the driving means begins to operate, and means for holding the disconnecting means in disconnected position and the clamping means in clamping relation until the lacing operations are completed.

17. A machine for lacing eyeletted shoe uppers having, in combination, mechanism including eyelet engaging devices for lacing a series of eyelets in an upper, spacing means for moving said devices relatively to each other, and yielding means tending to prevent said devices from being moved together during lacing operations.

18. A shoe upper lacing machine having, in combination, a main operating shaft, lacing forming mechanism driven from the operating shaft including a plurality of eyelet locating devices arranged to permit the aligned eyelets of a folded shoe upper to be impaled thereon, mechanism connected to said devices for effecting a simultaneous spacing adjustment thereof prior to impaling an upper, and means actuated as the lacing mechanism is started and prior to lace forming to disconnect said spacing mechanism from the eyelet locating devices to permit independent spacing of said devices by the action of the impaled eyelets.

19. A shoe upper lacing machine having, in combination, a main operating shaft, lacing forming mechanism driven from the operating shaft including a plurality of eyelet locating devices arranged to permit the aligned eyelets of a folded shoe upper to be impaled thereon, mechanism connected to said devices for effecting a simultaneous spacing adjustment thereof prior to impaling an upper, means to disconnect said spacing mechanism from the eyelet locating devices to permit independent spacing of said devices by the action of the impaled eyelets, and control means acting in timed relation with the starting of the lacing mechanism and prior to lace forming to render said disconnecting means operative to disconnect the spacing mechanism.

20. A machine for lacing eyeletted shoe uppers having, in combination, a main operating shaft, a plurality of lacing mechanisms driven from the operating shaft including eyelet engaging devices for operating upon a series of eyelets in an upper, manually controlled spacing connections between the lacing mechanisms for changing the distances between the mechanisms proportionately, and means acting on said spacing connections as the lacing mechanisms are started in operation for rendering the eyelet engaging devices capable of being adjusted independently of each other when lacing disproportionately spaced eyelets.

21. A shoe upper lacing machine having, in combination, a main operating shaft, lacing forming mechanism driven from the operating shaft including a plurality of eyelet locating devices arranged to permit the aligned eyelets of a folded shoe upper to be impaled thereon, mechanism connected to said devices for effecting a simultaneous spacing adjustment therefor prior to impaling an upper, upper clamping devices, and means for actuating the upper clamping devices as the operating shaft is started to clamp an upper and for disconnecting said spacing mechanism prior to clamping the upper impaled on the locating devices to permit independent spacing of said locating devices by the action of the impaled eyelets.

22. A machine for lacing eyeletted shoe uppers having, in combination, a main operating shaft, lacing forming mechanisms including a plurality of needles, means for actuating said mechanisms from the operating shaft, spacing mechanism connecting the lacing mechanisms for changing the distances between the lacing mechanisms arranged to render the needles capable of an additional adjustment relatively to each other by contact with the eyelets, and means actuated by the operating shaft after the eyelets are laced for returning the needles to the positions to which they were moved by the spacing mechanisms.

23. A machine for lacing eyeletted shoe uppers having, in combination, a main operating shaft, a plurality of lacing mechanisms including needles upon which the eyelets of an upper are impaled, means for actuating the lacing mechanisms from the operating shaft, spacing connections between the lacing mechanisms for changing the distances between the lacing mechanisms before the upper is applied to the machine, means acting on the spacing connections for disconnecting the connections from the lacing mechanism before the actuating means is thrown into operation and for again connecting the lacing mechanisms with the spacing connections when the actuating mechanism is thrown out of operation.

24. A shoe upper lacing machine having, in combination, a main operating shaft, lacing forming mechanism driven from the operating shaft including a plurality of eyelet locating devices arranged to permit the aligned eyelets of a folded shoe upper to be impaled thereon, and mechanism connected to the eyelet locating devices for effecting a simultaneous spacing adjustment of said devices prior to impaling an upper comprising loose connections between the locating devices, the parts of which connections are capable of moving independently of each other, and a single control member operatively connected to said loose connections for causing all the loose connections to become rigid.

25. A shoe upper lacing machine having, in combination, a main operating shaft, lacing forming mechanism driven from the operating shaft including a plurality of eyelet locating devices arranged to permit the aligned eyelets of a folded shoe upper to be impaled thereon, and mechanism connected to the eyelet locating devices for effecting a simultaneous spacing adjustment of said devices prior to impaling an upper comprising a spacing lever, links connected to the eyelet locating devices, removable pivots connecting the links to the spacing lever, and an arm to which the pivots are secured for actuating all the pivots towards and from the links to cause the connections between the links and lever to become rigid or loose.

JOSEPH FOSSA.